Patented July 23, 1940

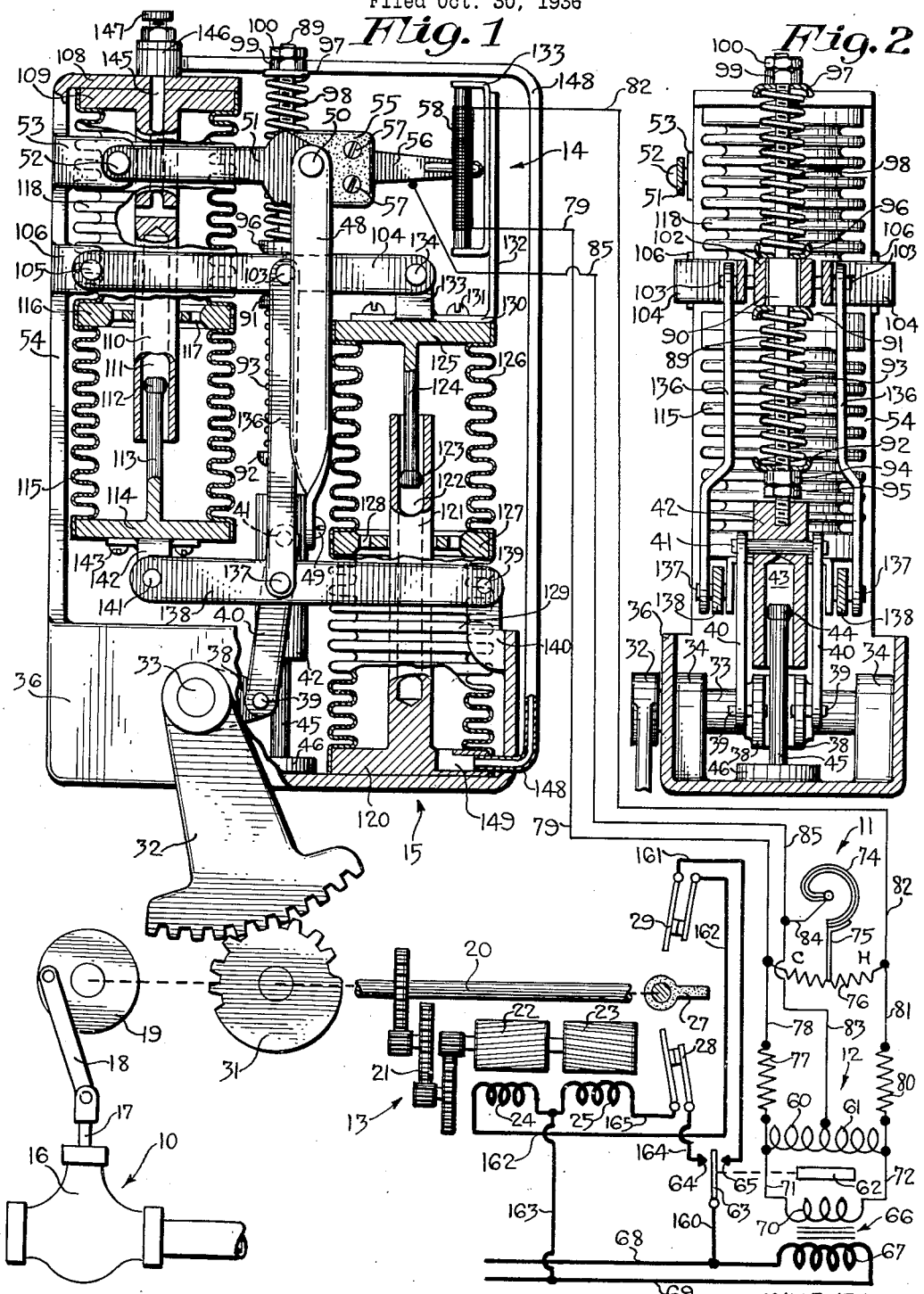

2,208,753

UNITED STATES PATENT OFFICE 2,208,753

AUTOMATIC RESET MECHANISM

William H. Edmondson, Minneapolis, Minn., assignor to Minneapolis-Honeywell Regulator Company, Minneapolis, Minn., a corporation of Delaware Application October 30, 1936, Serial No. 108,433

16 Claims. (Cl. 236—78)

This invention relates to an automatic reset or load compensation mechanism in general and more particularly to a mechanism of this type for use with a follow-up control system of the electrical type.

It is an object of this invention to provide in combination with a follow-up control system an automatic reset mechanism of novel construction to maintain the value of a condition to be controlled at a desired normal value regardless of changes in load affecting the control system.

A further object of this invention is to provide a reset mechanism that operates in conjunction with the follow-up mechanism of the control system for performing the desired results.

Still another object of this invention is to provide a spring biased hydraulic reset mechanism of novel construction.

Other objects and advantages will become apparent to those skilled in the art upon reference to the accompanying specification, claims and drawing.

For a more thorough understanding of this invention reference is made to the accompanying single sheet of drawings, in which:

Figure 1 diagrammatically discloses a follow-up control system of the electrical type, along with a partial sectional view of the automatic reset or load compensation mechanism.

Figure 2 is a sectional view taken through the center of Figure 1 and looking toward the left in Figure 1.

Referring now to the drawing, a device generally designated at 10 is adapted to be positioned in a plurality of positions for controlling the value of the condition to be controlled. A condition responsive device, responsive to changes in the value of the condition to be controlled, is generally designated at 11 and this condition responsive device has a normal state corresponding to a normal value of the condition. The condition responsive device 11 is adapted to operate a normally balanced relay generally designated at 12 for controlling the operation of a motor generally designated at 13 which in turn positions the control device 10. A follow-up mechanism is generally designated at 14 for operating on the relay 12 so that the device 10 may be positioned in any number of given positions. The automatic reset mechanism is generally designated at 15 and effects the operation of the follow-up mechanism 14 to compensate for changes in load affecting the condition to be controlled.

Although this invention may be used to control any condition, it is shown and described in this application as controlling a temperature condition and more specifically the temperature condition of a space. Therefore, the device 10 which is adapted to be positioned in a plurality of positions is shown to be a valve 16 for controlling the supply of heating fluid to a space, not shown. The valve 16 may be operated by a valve stem 17 connected by a pitman 18 to a crank disc 19. The crank disc 19 is attached to a shaft 20 of the motor 13. Shaft 20 is driven through a reduction gear train 21 by motor rotors 22 and 23. The motor rotors 22 and 23 are operated by field windings 24 and 25, the arrangement being such that when the field winding 24 is energized the valve 16 is moved towards an open position and when the field winding 25 is energized the valve 16 is moved towards a closed position. The shaft 20 also operates an abutment member 27, preferably made of insulating material, for opening limit switches 28 and 29 when the valve 16 is moved to either an extreme open or an extreme closed position.

Shaft 20 also carries a gear 31 which meshes with a gear sector 32 mounted on a shaft 33. The shaft 33 is journaled in bearings 34 suitably mounted in a support 36 of the reset mechanism 15. The arrangement is such that as the valve 16 is moved towards the open position the gear sector 32 is moved in a counter-clockwise direction.

The shaft 33 carries crank arms 38 which in turn carry crank pins 39. One end of links 40 are connected to the crank pins 39 and the other ends of the links 40 are connected to a pin 41 mounted in a block 42. The block 42 has a bore 43 which is adapted to receive a guide 44 mounted on a pin 45 which in turn is suitably secured in a boss 46 on the support 36. As the gear sector 32 is rotated the block 42 is reciprocated up and down and this reciprocation is guided by the guide 44.

A link 48 is suitably secured to the block 42 by a screw 49 and carries a pin 50 at its upper extremity which engages a pivoted lever 51. Lever 51 is pivoted by means of a pin 52 mounted in a bracket 53 formed on an upwardly extending support 54 which may be made integral with the support 36. The lever 51 carries an insulating pad 55 to which is secured a slider 56 by means of screws 57. The slider 56 is adapted to slide across a resistance element 58 and the slider 56 and the resistance element 58 form a balancing potentiometer the operation of which will be more fully pointed out hereafter.

The relay mechanism generally designated at 12 may comprise relay coils 60 and 61 for operating an armature 62. The armature 62 is suitably connected to a switch arm 63 which is adapted to engage contacts 64 or 65. Power is supplied to the relay by means of a step-down transformer 66 having a primary 67 connected across line wires 68 and 69 and a secondary 70. One end of the secondary 70 is connected by a wire 71 to the left end of the relay coil 60 and the other end of the secondary 70 is connected by a wire 72 to the right-hand end of the relay coil 61. The other ends of the relay coils 60 and 61 are connected together. By reason of these connections it is seen that the relay coils 60 and 61 are connected in series and across the secondary 70. When the relay coil 60 is energized more than the relay coil 61 the switch arm 63 is moved into engagement with the contact 64 and when the relay coil 61 is energized more than the relay coil 60 the switch arm 63 is moved into engagement with the contact 65. When the relay coils 60 and 61 are equally energized the switch arm 63 assumes a position midway between the contacts 64 and 65, as shown in the drawing.

The means responsive to the condition to be controlled is shown to be a thermostatic means having a bimetallic element 74 responding to changes in the value of the space temperature. The bimetallic element 74 operates a slider 75 with respect to a potentiometer resistance 76. Upon a decrease in space temperature the slider 75 is moved to the left in the direction indicated by the character C and upon an increase in space temperature the slider 75 is moved to the right in the direction indicated by the character H. The parts are so arranged that when the space temperature is at the desired normal value the slider 75 is in a midposition with respect to the potentiometer resistance element 76. This is the normal state of the condition responsive device 11.

The left end of the relay coil 60 is connected by a protective resistance 77 and wires 78 and 79 to the left-hand end of the control potentiometer resistance element 76 and to the lower end of the balancing potentiometer resistance element 58. In a like manner, the right-hand end of the relay coil 61 is connected by a protective resistance 80 and wires 81 and 82 to the right-hand end of the control potentiometer resistance element 76 and to the upper end of the balancing potentiometer resistance element 58. The junction of the coils 60 and 61 is connected by wires 83, 84 and 85 to the slider 75 of the control potentiometer and to the slider 56 of the balancing potentiometer. By reason of these wiring connections it is seen that the control potentiometer and the balancing potentiometer are connected in parallel with the series connected coils 60 and 61, and that all of these elements are connected across the secondary 72.

It is assumed for the present that the potentiometer resistance element 58 of the balancing potentiometer is stationary. With the parts in the position shown in Figure 1, the slider 75 of the control potentiometer is in a mid-position and the slider 56 of the balancing potentiometer is in a mid-position, and by reason of these positions the relay coils 60 and 61 are equally energized and the switch arm 63 is spaced midway between the contacts 64 and 65. Therefore, the motor 13 is not in operation and the valve 16 is in a mid-position. With the parts in these positions it is assumed that the correct amount of heat is being supplied to the space to just make up for the heating load.

Upon a decrease in space temperature the slider 75 is moved to the left in the direction indicated by the character C and this movement causes partial short-circuiting of the relay coil 60 to decrease the energization thereof and to increase the energization of the relay coil 61, this being brought about by the parallel relationship pointed out above. When the relay coil 61 is energized more than the relay coil 60 in this manner the switch arm 63 is moved into engagement with the contact 65 to complete a circuit from the line wire 68 through wire 160, switch arm 63, contact 65, wire 161, limit switch 29, wire 162, field winding 24, and wire 163 back to the other line wire 69. Completion of this circuit causes energization of the field winding 24 to move the valve 16 towards an open position. Movement of the valve 16 towards an open position increases the supply of heat to the space and also causes counter-clockwise movement of the gear sector 32. This in turn causes upward movement of the slider 56 with respect to the balancing potentiometer resistance 58. This upward movement of the slider 56 partially short-circuits the relay coil 61 to decrease the energization thereof and to increase the energization of the relay coil 60. When the slider 56 has moved sufficiently far so as to rebalance the energizations of the relay coils 60 and 61, the switch arm 63 is moved out of engagement with the contact 65 to stop operation of the motor 13 and consequently hold the valve 16 in its new position.

Upon an increase in space temperature the slider 75 is moved towards the right in the direction indicated by the character H and this right-hand movement causes partial short-circuiting of the relay coil 61 to decrease the energization thereof and to increase the energization of the relay coil 60. This causes movement of the switch arm 63 into engagement with the contact 64 to complete a circuit from the line wire 68 through wire 160, switch arm 63, contact 64, wire 164, limit switch 28, wire 165, field winding 25, and wire 163 back to the other line wire 69. Completion of this circuit causes energization of the field winding 25 to move the valve 16 towards a closed position to decrease the supply of heat to the space. Movement of the valve 16 towards a closed position causes downward movement of the slider 56 with respect to the balancing potentiometer resistance element 58. This causes partial short-circuiting of the relay coil 60 to decrease the energization thereof and increase the energization of the relay coil 61. When the slider 56 has moved sufficiently far in the downward direction to rebalance the relay coils 60 and 61, the switch arm 63 is moved out of engagement with the contact 64 to stop operation of the motor 13 and to maintain the valve 16 in its new position. In this manner the valve 16 is positioned in accordance with changes in space temperature in an attempt to maintain the space temperature at the desired normal value.

If the control range of the control potentiometer is made sufficiently narrow to maintain the space temperature within very close limits "hunting" occurs and the valve is moved continuously between open and closed positions. In order to remedy this "hunting" the control range is widened to maintain the space temperature within wider limits. However, in many instances sufficiently accurate control cannot be maintained by this wide differential setting of the controller. Also, when the differential setting of the controller is made sufficiently wide to prevent "hunting," a decided drooping characteristic becomes apparent with changes in load. The automatic reset mechanism of this invention is provided to prevent the drooping characteristic and to prevent "hunting" so that the space temperature is maintained within extremely narrow limits and in fact it is maintained at substantially the desired normal value at all times regardless of changes in load conditions. The structure and mode of operation of the reset mechanism generally designated at 15 now follows:

Screw threaded into the block 42 is a rod 89 having intermediate its ends an enlarged shoulder 90. Abutting against the lower edge of this shoulder 90 is a spring retainer cup 91 and also mounted on the rod 89 is a spring retainer cup 92. Spring retainer cups 91 and 92 carry between them a spring 93 and the compression of the spring 93 may be adjusted by a nut 94 which is clamped in an adjusted position on the rod 89 by a lock nut 95. Abutting the upper edge of the shoulder 90 is a spring retainer cup 96 and also mounted on the rod 89 is a spring retainer cup 97. The spring retainer cups 96 and 97 carry between them a spring 98 and the compression of the spring 98 may be adjusted by a nut 99 which is locked in its adjusted position on the rod 89 by a lock nut 100. The springs 93 and 98 are preferably placed under an initial compression.

A collar of the same length as the shoulder 90 is loosely mounted on the shoulder 90 and is held adjacent the shoulder 90 by the spring retainer cups 91 and 96. The collar 102 carries pins 103 and mounted on the pins 103 are levers 104. One end of the levers 104 are pivoted on pins 105 suitably secured to brackets 106 carried by the extension 54 of the support 36.

The extension 54 of the support 36 is bent over in a horizontal plane to form an extension 108 to which is suitably secured a base 109. The base 109 carries a guide stem 110 in the outer end of which is located a bore 111. The bore 111 is adapted to receive a guide 112 mounted on a pin 113 which may be made integral with a closure member 114. The closure member 114 has secured thereto in any suitable manner one end of bellows 115. The other end of the bellows 115 is suitably secured to a guide plate 116, and this guide plate has openings 117 extending therethrough. One end of a bellows 118 is also connected to the guide plate 116 and the other end of the bellows 118 is connected to the base 109. The base 109, the movable closure member 114 and the bellows 115 and 118 therefore form a first enclosed expansible and contractable chamber. The guide plate 116 is slidably mounted on the guide stem 110 so that the intermediate portion of the expansible and contractable chamber is guided. The movable enclosure 114 is also guided by the guide stem 110.

Mounted on the support 36 is another base 120 having a guide stem 121 the extremity of which contains a bore 122. Slidably mounted in the bore 122 is a guide member 123 mounted on a stem 124. The stem 124 may be made integral with a movable closure member 125. One end of a bellows 126 is suitably secured to the movable closure member 125 and the other end thereof is connected to a guide plate 127. The guide plate 127 is also provided with openings 128 therethrough. One end of a bellows 129 is also connected to the guide plate 127 and the other end thereof is connected to the base 120. The base 120, the movable closure member 125, and the bellows 126 and 129 form a second enclosed expansible and contractable chamber. The intermediate portions of the chamber are guided by the guide plate 128 which is slidably mounted on the guide stem 121 and the movable enclosure member is guided by the guide stem 121 by reason of the guide member 123 being slidably mounted in the bore 122 of the guide stem 121.

The movable closure member 125 has a bracket 130 secured thereto by means of screws 131. The bracket 130 has an upwardly extending portion 132 which carries a frame 133 for supporting the resistance element 58 of the balancing potentiometer. The bracket 130 also has another upwardly extending portion 133 which is connected to the pivoted lever 104 by a pivot pin 134. In this manner the resistance element 58 of the balancing potentiometer is carried by the closure 125 of the second expansible and contractable chamber and moved in accordance with the expansion and contraction thereof.

The pins 103 carried by the collar 102 are connected to one end of links 136 which extend downwardly. The downward extremity of the links 136 carry pins 137 which are connected to links 138. The links 138 are pivoted by means of pivot pins 139 to brackets 140 which may be formed integrally with the support 36. The links 138 also carry pivot pins 141 mounted in a bracket 142 suitably secured to the movable closure member 114 of the first expansible and contractable chamber by means of screws 143.

The extension 108 and the base 109 are provided with an opening 145 communicating with the interior of the first expansible and contractable chamber. A needle valve 146 having a suitable operating knob 147 for adjusting the same, controls the connection between the passage 145 and a conduit 148. The conduit 148 also communicates with the second expansible and contractable chamber by a passage 149 located in the base 120. The first and second expansible and contractable chamber and the passages and conduits therebetween are completely filled with a substantially non-elastic liquid.

With the parts in the position shown in the drawing the space temperature is at the desired normal value, the valve 16 is in a mid-position and just the correct amount of heat is being supplied to the space to make up for the heat losses from the space. Upon an increase in the heating load the space temperature decreases to move the valve 16 towards an open position in the manner pointed out above. Movement of the valve 16 towards an open position causes upward movement of the slider 55 of the balancing potentiometer and this amount of upward movement is proportional to the amount that the space temperature has deviated from normal. Therefore, the valve 16 is initially moved towards an open position corresponding to the amount of deviation. Movement of the valve 16 towards an open position causes upward movement of the block 42 which causes upward movement of the shoulder 90. Shoulder 90 moves the upper spring retainer cup 96 out of engagement with the collar 102 and allows the spring 93 to expend an upward force on the collar 102. The spring 93 is further compressed by the upward movement of the block 42. This upward force on the collar 102 is transmitted through the pins 103, the levers 104 and the bracket 133 to tend to expand the second expansible chamber and move the resistance element 58 upwardly. Also the expansion of the spring 93 exerts a force through the pins 103, the links 136, the pins 137, the levers 138, the bracket 142 and the closure member 114 to contract the first expansible and contractable chamber. However, the first chamber cannot immediately be contracted and the second chamber cannot immediately be expanded by reason of the fact that these chambers are hydraulically connected together through a restricted passage. This spring effort then tends to force liquid from the first expansible chamber into the second expansible chamber and the rate at which liquid is transferred from one chamber to the other is controlled by the needle valve 146.

As the resistance element 58 is gradually moved upwardly by the action of the spring 93 under the control of the needle valve 146, the relay coil 60 is gradually short-circuited to decrease the energization thereof and to increase the energization of the relay coil 61. This causes movement of the switch arm 63 into engagement with contact 65 to move the valve 16 further towards an open position, and the valve will be continued in its opening movement until such time as the resistance element 58 of the balancing potentiometer is moved upwardly to center itself with respect to the slider 56. However, as the resistance element 58 is being moved upwardly heat is being supplied to the space as a result of the opening movement of the valve 16. This heat causes movement of the slider 75 from the left to the normal mid-position and if the needle valve 146 is properly adjusted the balancing potentiometer will be centered at substantially the same time that the slider 75 of the control potentiometer assumes a new position. In this manner the valve 16 is moved further towards an open position to supply additional heat to the space to compensate for changes in load affecting the space temperature, whereby the space temperature is maintained at the desired value regardless of the additional load on the heating system.

Conversely, upon a decrease in load, the space temperature increases to move the slider 75 of the control potentiometer to the right in the direction indicated by the character H. This causes partial short-circuiting of the relay coil 61 to decrease the energization thereof and increase the energization of the coil 60 to move the switch arm 63 into engagement with the contact 64. This causes movement of the valve 16 towards a closed position. Movement of the valve 16 towards a closed position causes downward movement of the block 42 to cause downward movement of the slider 56 of the balancing potentiometer and therefore the valve 16 is moved to a position corresponding to the amount of deviation of the space temperature. Downward movement of the block 42 moves the shoulder 90 downwardly to move the spring retainer cup 91 out of engagement with the collar 102 and also increases the compression in the upper compression spring 98. The effort of the upper spring 98 is transmitted through the pins 103 to the lever 104 to cause contraction of the second expansible chamber and is transmitted through the links 136 and the levers 138 to cause expansion of the first expansible chamber. The rate of contraction of the second expansible chamber and the rate of expansion of the first expansible chamber is controlled by the needle valve 146.

Contraction of the second expansible chamber causes downward movement of the resistance element 58 of the balancing potentiometer with respect to the slider 56. This causes partial short-circuiting of the relay coil 61 to decrease the energization thereof and to increase the energization of the relay coil 60 to move the switch arm 63 into engagement with the contact 64. This causes additional movement of the valve 16 towards a closed position, thereby additionally decreasing the supply of heat to the space to make up for the decrease in load causing the deviation in space temperature. If the needle valve 146 is properly adjusted the balancing potentiometer will become centered at substantially the same time that the space temperature returns to normal due to this decrease in the supply of heat to the space.

From the above it is seen that when the temperature of the space deviates from the desired normal value the valve is operated in an amount corresponding to the amount of deviation and then is operated an additional amount which restores the space temperature to the desired normal value. Therefore, the valve 16 may assume any number of positions while the space temperature is at the desired normal value, and these various positions of the valve 16 are made in accordance with the changes in load affecting the space temperature. Stated in another manner, the valve 16 is reset in accordance with changes in the load affecting the space temperature whereby the space temperature is maintained at the desired normal value regardless of changes in the load. By suitably adjusting the needle valve 146 the rate at which the reset is accomplished may be varied to suit the control system for the control of any condition.

When the valve 16 is moved in response to a deviation in space temperature either the spring 93 or the spring 98 is compressed dependent upon which way the space temperature deviates. When the space temperature deviates a relatively large amount the valve 16 is moved a relatively large amount and therefore a relatively large amount of compression is placed in either spring 93 or spring 98. In other words, the amount of compression placed in the springs 93 and 98 is dependent upon the amount of deviation of the space temperature from the desired normal value. The flow of liquid from one expansible and contractable chamber to the other is dependent upon the amount of spring pressure tending to force this liquid from the one chamber to the other and since the springs 93 and 98 are compressed a great amount for a relatively large deviation in space temperature the liquid will be forced from one chamber to the other more rapidly than when the deviation of the space temperature is only slight. Therefore, it follows that the rate of reset is proportional to the amount of deviation of the space temperature.

From the above it is seen that I have provided a follow-up system of the electrical type for controlling the value of a condition wherein a device is moved to a plurality of positions for controlling the value of the condition wherein a controller responsive to changes in the value of the condition operates the device to maintain the value of the condition within predetermined limits, and wherein a reset mechanism is operatively associated with the follow-up means of the follow-up system for additionally positioning the device in accordance with changes in load affecting the condition to be controlled. The reset mechanism is so arranged that the rate of reset is varied in accordance with the amount of deviation of the condition to be controlled from the desired normal value. Also provision is made in the reset mechanism for adjusting the rate of reset for any given particular deviation of the condition to be controlled from the desired normal value. By reason of this construction the condition to be controlled is maintained at a substantially constant value regardless of changes in load conditions and "hunting" of the control system is substantially prevented.

Although for purposes of illustration I have shown one form of my invention, other forms thereof may become apparent to those skilled in the art, and therefore this invention is to be limited only by the scope of the appended claims and prior art.

I claim as my invention:

1. In combination, a device to be positioned in a plurality of positions to control the value of a condition, control resistance means varied in accordance with changes in the value of the condition and having a desired resistance value corresponding to a desired normal value of the condition, electrical relays means in control of the device, balancing resistance means, including a resistance element and a slider, means operated by said device for operating said slider, connections between said relay means, said control resistance means and said balancing resistance means for positioning said device in accordance with changes in the value of the control resistance means whereby the condition to be controlled is maintained within certain limits, means operated by said device for operating said resistance element additionally to position said device for returning the value of the condition to be controlled toward the desired normal value, said last mentioned means including a pair of intercommunicating expansible chambers, liquid in said chambers, means, including a spring pressed lost motion connection, for operating one of the chambers by said device, and means for operating said resistance element by the other expansible chamber.

2. In combination, a device to be positioned in a plurality of positions to control the value of a condition, control resistance means varied in accordance with changes in the value of the condition and having a desired resistance value corresponding to a desired normal value of the condition, electrical relay means in control of the device, balancing resistance means, including a resistance element and a slider, means operated by said device for operating said slider, connections between said relay means, said control resistance means and said balancing resistance means for positioning said device in accordance with changes in the value of the control resistance means whereby the condition to be controlled is maintained within certain limits, means operated by said device for operating said resistance element additionally to position said device for returning the value of the condition to be controlled toward the desired normal value, said last mentioned means including a pair of intercommunicating expansible chambers, liquid in said chambers, means, including a spring pressed lost motion connection, for operating one of the chambers by said device, means for operating said resistance element by the other expansible chamber, and means for varying the size of the communication between the expansible chambers.

3. A reset mechanism comprising, in combination, a member, a control element cooperating with said member to perform a control function, an expansible chamber for operating the member, a second expansible chamber, a restricted passageway between the expansible chambers, fluid in said expansible chambers, spring means for operating the second expansible chamber, and means for operating simultaneously the spring means and the control element to cause first the control element to be moved with respect to the member and second the member to be moved with respect to the control element.

4. A reset mechanism comprising, in combination, a member, a control element cooperating with said member to perform a control function, an expansible chamber for operating the member, a second expansible chamber, a restricted passageway between the expansible chambers, fluid in said expansible chambers, spring means for operating the second expansible chamber, means for operating simultaneously the spring means and the control element, to cause first the control element to be moved with respect to the member and second the member to be moved with respect to the control element, and means for varying the restriction of the passageway to vary the rate of movement of the member.

5. In combination, a device to be positioned in a plurality of positions to control the value of a condition, control means the state of which is varied in accordance with changes in the value of the condition to be controlled and having a a desired normal state corresponding to a desired normal value of the condition, follow-up means, operating means operated by the device for operating the follow-up means, means controlled by the control means and the follow-up means to position said device in proportion to changes in the state of the control means whereby the value of the condition to be controlled is maintained within certain limits, and means, including time delay means, included in said operating means and operative as an incident to deviation of the condition to be controlled from the desired normal value for operating said follow-up means additionally to position said device with respect to the state of the control means for returning the value of the condition toward the desired normal value, the rate of additional positioning of the device being controlled by the time delay means and being a function of the amount of deviation of the condition from the desired normal value.

6. In combination, a device to be positioned in a plurality of positions to control the value of a condition, control means the state of which is varied in accordance with changes in the value of the condition to be controlled and having a desired normal state corresponding to a desired normal value of the condition, follow-up means, operating means operated by the device for operating the follow-up means, means controlled by the control means and the follow-up means to position said device in proportion to changes in the state of the control means whereby the value of the condition to be controlled is maintained within certain limits, means including time delay means, included in said operating means and operative as an incident to deviation of the condition to be controlled from the desired normal value for operating said follow-up means additionally to position said device with respect to the state of the control means for returning the value of the condition toward the desired normal value, and means for adjusting the time delay means for varying the rate of additional positioning of the device.

7. In combination, a device to be positioned in a plurality of positions to control the value of a condition, control means the state of which is varied in accordance with changes in the value of the condition to be controlled and having a desired normal state corresponding to a desired normal value of the condition, follow-up means, operating means operated by the device for operating the follow-up means, means controlled by the control means and the follow-up means to position said device in accordance with changes in the state of the control means whereby the value of the condition to be controlled is maintained within certain limits, and means included in said operating means and operative as an incident to deviation of the condition to be controlled from the desired normal value for operating said follow-up means additionally to position said device with respect to the state of the control means for returning the value of the condition toward the desired normal value, said last mentioned means including means for biasing the follow-up means to a desired position and means for operating the follow-up means against the action of the biasing means and subsequently allowing the biasing means to return the follow-up means to the desired position for additionally positioning the device.

8. In combination, a device to be positioned in a plurality of positions to control the value of a condition, control means the state of which is varied in accordance with changes in the value of the condition to be controlled and having a desired normal state corresponding to a desired normal value of the condition, follow-up means, operating means operated by the device for operating the follow-up means, means controlled by the control means and the follow-up means to position said device in accordance with changes in the state of the control means whereby the value of the condition to be controlled is maintained within certain limits, and means included in said operating means and operative as an incident to deviation of the condition to be controlled from the desired normal value for operating said follow-up means additionally to position said device with respect to the state of the control means for returning the value of the condition toward the desired normal value, said last mentioned means including means for biasing the follow-up means to a desired position, means for operating the follow-up means against the action of the biasing means and subsequently allowing the biasing means to return the follow-up means to the desired position for additionally positioning the device and means for adjusting said last mentioned means to adjust the rate at which the device is additionally positioned.

9. In combination, a device to be positioned in a plurality of positions to control the value of a condition, control means the state of which is varied in accordance with changes in the value of the condition to be controlled and having a desired normal state corresponding to a desired normal value of the condition, follow-up means, operating means operated by the device for operating the follow-up means, means controlled by the control means and the follow-up means to position said device in accordance with changes in the state of the control means whereby the value of the condition to be controlled is maintained within certain limits, and means included in said operating means and operative as an incident to deviation of the condition to be controlled from the desired normal value for operating said follow-up means additionally to position said device with respect to the state of the control means for returning the value of the condition toward the desired normal value, said last mentioned means including means for biasing the follow-up means to a desired position and hydraulic means for operating the follow-up means against the action of the biasing means and subsequently allowing the biasing means to return the follow-up means to the desired position for additionally positioning the device.

10. In combination, a device to be positioned in a plurality of positions to control the value of a condition, control means the state of which is varied in accordance with changes in the value of the condition to be controlled and having a desired normal state corresponding to a desired normal value of the condition, follow-up means, operating means operated by the device for operating the follow-up means, means controlled by the control means and the follow-up means to position said device in accordance with changes in the state of the control means whereby the value of the condition to be controlled is maintained within certain limits, and means included in said operating means and operative as an incident to deviation of the condition to be controlled from the desired normal value for operating said follow-up means additionally to position said device with respect to the state of the control means for returning the value of the condition toward the desired normal value, said last mentioned means including a pair of fluid filled expansible chambers for operating the follow-up means and biasing means for biasing the follow-up means to a desired position for additionally positioning the device.

11. In combination, a device to be positioned in a plurality of positions to control the value of a condition, control electrical resistance means varied in accordance with changes in the value of the condition and having a desired resistance value corresponding to a desired normal value of the condition, balancing electrical resistance means, operating means operated by the device for adjusting the balancing resistance means, means controlled by the control resistance means and the balancing resistance means to position said device in accordance with changes in the resistance value of the control resistance means whereby the condition to be controlled is maintained within desired limits, and means, including time delay means, included in said operating means and operative as an incident to deviation of the condition to be controlled from the desired normal value for operating said balancing resistance means additionally to position said device with respect to the state of the control means for returning the value of the condition toward the desired normal value, the rate of additional positioning of the device being controlled by the time delay means and being a function of the amount of deviation of the condition from the desired normal value.

12. In combination, a device to be positioned in a plurality of positions to control the value of a condition, control electrical resistance means varied in accordance with changes in the value of the condition and having a desired resistance value corresponding to a desired normal value of the condition, balancing electrical resistance means, operating means operated by the device for adjusting the balancing resistance means, means controlled by the control resistance means and the balancing resistance means to position said device in accordance with changes in the resistance value of the control resistance means whereby the condition to be controlled is maintained within desired limits, and means included in said operating means and operative as an incident to deviation of the condition to be controlled from the desired normal value for operating said balancing resistance means additionally to position said device with respect to the state of the control means for returning the value of the condition toward the desired normal value, said last mentioned means including means for biasing the balancing resistance means to a desired resistance value and means for adjusting the balancing resistance means against the action of the biasing means and subsequently allowing the biasing means to adjust the balancing resistance means to the desired resistance value.

13. In combination, a device to be positioned in a plurality of positions to control the value of a condition, control electrical resistance means varied in accordance with changes in the value of the condition and having a desired resistance value corresponding to a desired normal value of the condition, balancing electrical resistance means, operating means operated by the device for adjusting the balancing resistance means, means controlled by the control resistance means and the balancing resistance means to position said device in accordance with changes in the resistance value of the control resistance means whereby the condition to be controlled is maintained within desired limits, and means included in said operating means and operative as an incident to deviation of the condition to be controlled from the desired normal value for operating said balancing resistance means additionally to position said device with respect to the state of the control means for returning the value of the condition toward the desired normal value, said last mentioned means including a pair of fluid filled expansible chambers for adjusting the balancing resistance means and biasing means for biasing the balancing resistance means to a desired value for additionally positioning the device.

14. In combination, a device to be positioned in a plurality of positions to control the value of a condition, control electrical resistance means varied in acordance with changes in the value of the condition and having a desired resistance value corresponding to a desired normal value of the condition, balancing electrical resistance means including first and second elements movable with respect to each other, operating means operated by the device for relatively moving the elements of the balancing resistance means, means controlled by the control resistance means and the balancing resistance means to position said device in accordance with changes in the resistance value of the control resistance means whereby the condition to be controlled is maintained within desired limits, said operating means including means for moving the first element of the balancing resistance means with respect to the second element upon movement of the device and time delay means for moving the second element to a desired position with respect to the first element for additionally positioning said device with respect to the resistance value of the control resistance means for returning the value of the condition toward the desired normal value.

15. In combination, a device to be positioned in a plurality of positions to control the value of a condition, control electrical resistance means varied in accordance with changes in the value of the condition and having a desired resistance value corresponding to a desired normal value of the condition, balancing electrical resistance means including first and second elements movable with respect to each other, operating means operated by the device for relatively moving the elements of the balancing resistance means, means controlled by the control resistance means and the balancing resistance means to position said device in accordance with changes in the resistance value of the control resistance means whereby the condition to be controlled is maintained within desired limits, said operating means including biasing means for biasing the second element of the balancing resistance means to a desired position with respect to the first element, means for moving the first element in accordance with movement of the device and means for gradually allowing the biasing means to move the second element to the desired position with respect to the first element additionally to position the device with respect to the resistance value of the control resistance means for returning the value of the condition toward the desired normal value.

16. In combination, a device to be positioned in a plurality of positions to control the value of a condition, control electrical resistance means varied in accordance with changes in the value of the condition and having a desired resistance value corresponding to a desired normal value of the condition, balancing electrical resistance means including first and second elements movable with respect to each other, operating means operated by the device for relatively moving the elements of the balancing resistance means, means controlled by the control resistance means and the balancing resistance means to position said device in accordance with changes in the resistance value of the control resistance means whereby the condition to be controlled is maintained within desired limits, said operating means including biasing means for biasing the second element of the balancing resistance means to a desired position with respect to the first element, means for moving the first element in accordance with movement of the device and hydraulic dashpot means for gradually allowing the biasing means to move the second element to the desired position with respect to the first element additionally to position the device with respect to the resistance value of the control resistance means for returning the value of the condition toward the desired normal value.

WILLIAM H. EDMONDSON.